US010870545B2

(12) United States Patent
Lang et al.

(10) Patent No.: US 10,870,545 B2
(45) Date of Patent: Dec. 22, 2020

(54) DEVICE AND METHOD FOR SAFELY AND QUICKLY TRANSFERRING NEW GLASS SHEETS FROM THE PRODUCTION LINE TO A TRANSPORT VEHICLE

(71) Applicant: GRENZEBACH MASCHINENBAU GMBH, Asbach-Bäumenheim (DE)

(72) Inventors: Edwin Lang, Rain (DE); Christian Herfert, Langweid (DE)

(73) Assignee: GRENZEBACH MASCHINENBAU GMBH, Asbach-Bäumenheim (DE)

( * ) Notice: Subject to any disclaimer, the term of this patent is extended or adjusted under 35 U.S.C. 154(b) by 0 days.

(21) Appl. No.: 16/621,515

(22) PCT Filed: Jun. 18, 2018

(86) PCT No.: PCT/DE2018/000192
§ 371 (c)(1),
(2) Date: Dec. 11, 2019

(87) PCT Pub. No.: WO2018/233741
PCT Pub. Date: Dec. 27, 2018

(65) Prior Publication Data
US 2020/0172350 A1   Jun. 4, 2020

(30) Foreign Application Priority Data
Jun. 20, 2017 (DE) .................. 10 2017 005 809

(51) Int. Cl.
*B65G 47/04* (2006.01)
*B65G 49/05* (2006.01)
*B65G 49/06* (2006.01)

(52) U.S. Cl.
CPC ......... *B65G 49/067* (2013.01); *B65G 49/061* (2013.01); *B65G 49/068* (2013.01); *B65G 2249/04* (2013.01)

(58) Field of Classification Search
None
See application file for complete search history.

(56) References Cited

U.S. PATENT DOCUMENTS 1,970,749 A * 8/1934 Heichert .............. B65G 49/067
198/404
3,771,671 A * 11/1973 Cathers ................ B65G 49/067
414/789.2
(Continued)

FOREIGN PATENT DOCUMENTS

DE       2602622      7/1977
DE    102008024407   11/2008
(Continued)

*Primary Examiner* — Kavel Singh
(74) *Attorney, Agent, or Firm* — Duane Morris LLP; Gregory M. Lefkowitz; Jason M. Nolan

(57) ABSTRACT

The invention relates to a device and to a method for safely and quickly transferring new glass sheets from the production line to a transport vehicle, having the following features; a) a glass-sheet roller conveyor (8) having a glass-rack gripping and stacking device (7) for receiving glass sheets (9) from a production line, b) two parallel running rails (12) extending centrically at a right angle toward the glass-sheet roller conveyor (8), an underfloor energy supply rail (24) being arranged in the region between the running rails (12), c) at least one glass-rack carriage (3), which moves on the running rails (12) and which has at least one glass rack (4, 6) lying on said glass-rack carriage, a glass rack (4, 6) being able to be loaded with obliquely positioned glass sheets (9) and the glass racks (4, 6) being fixed in the oblique position by means of a pivoting device (14), and d) a rotary device (2) arranged in the course of the running rails for rotating a glass-rack carriage (3) by 180 degrees for loading one glass-rack carriage (3) at a time.

13 Claims, 7 Drawing Sheets

(56) References Cited

U.S. PATENT DOCUMENTS

Figure 1:
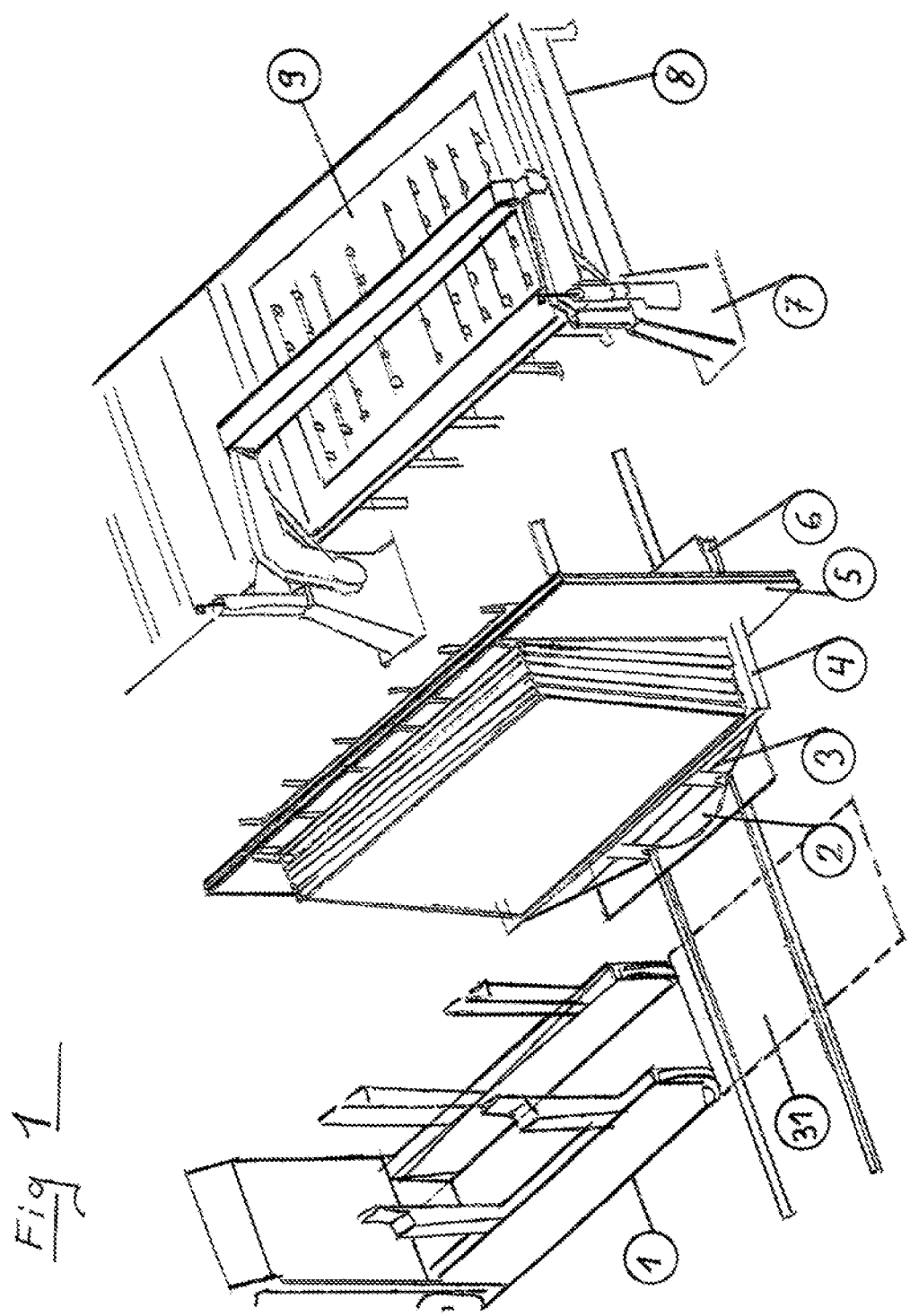

| | | | |
|---|---|---|---|
| 3,771,680 A * | 11/1973 | Cathers | B65G 49/067 |
| | | | 414/802 |
| 5,620,293 A | 4/1997 | Alarcon-Lopez et al. | |
| 6,077,018 A | 6/2000 | Lisec | |
| 7,353,954 B1 * | 4/2008 | Malek | B07C 5/3404 |
| | | | 198/400 |
| 8,757,355 B2 * | 6/2014 | Weigl | B65G 49/067 |
| | | | 198/379 |
| 8,911,197 B2 | 12/2014 | Rossmann | |
| 2007/0214925 A1 * | 9/2007 | Nishio | B28D 7/046 |
| | | | 83/401 |
| 2012/0207575 A1 | 8/2012 | Masoero et al. | |
| 2013/0202393 A1 | 8/2013 | Hashimoto et al. | |
| 2015/0151927 A1 | 6/2015 | Kronsteiner et al. | |

FOREIGN PATENT DOCUMENTS

| | | |
|---|---|---|
| EP | 0048334 | 3/1982 |
| EP | 2543446 | 1/2013 |
| WO | 2011015610 | 2/2011 |

* cited by examiner

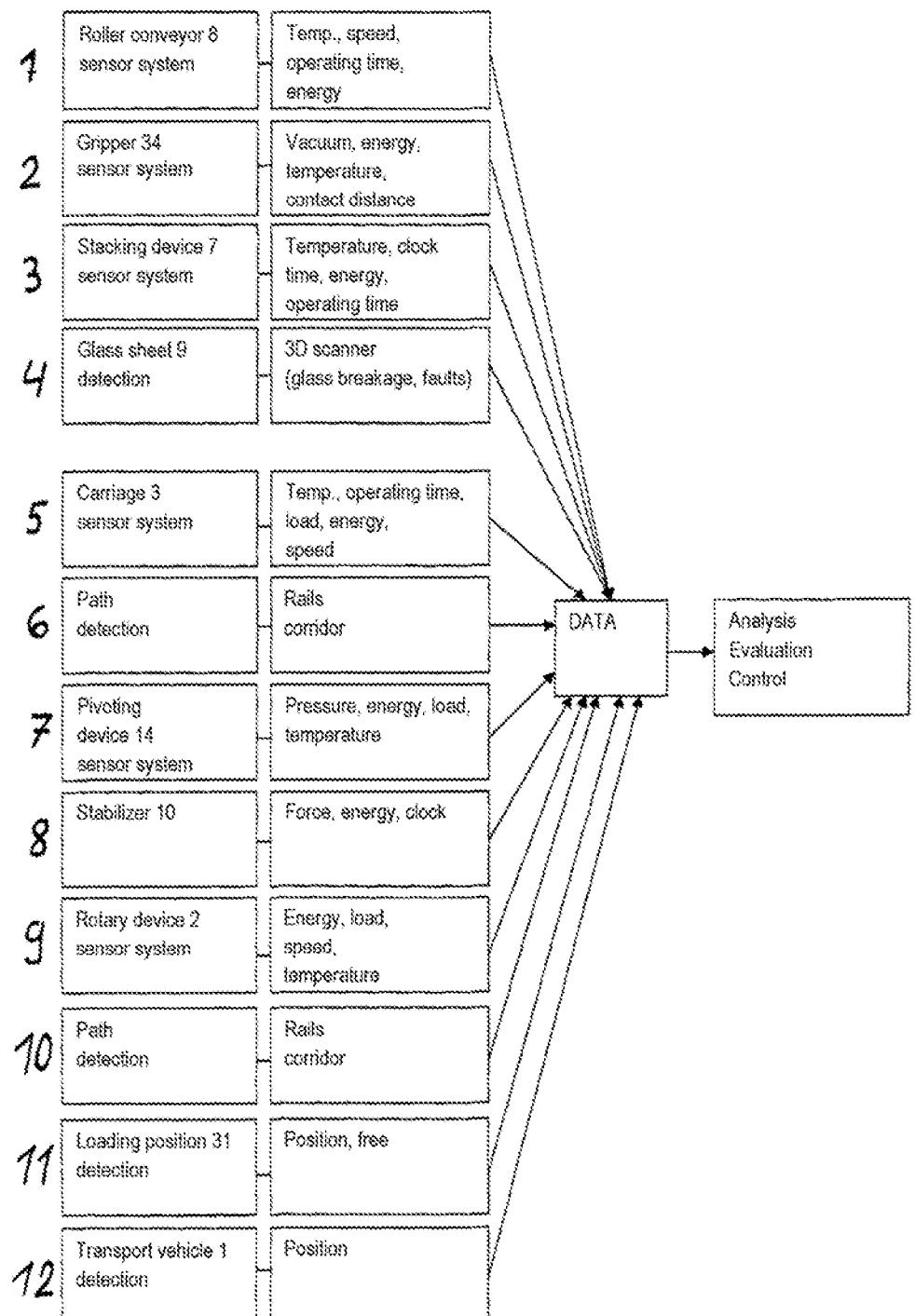

DEVICE AND METHOD FOR SAFELY AND QUICKLY TRANSFERRING NEW GLASS SHEETS FROM THE PRODUCTION LINE TO A TRANSPORT VEHICLE

CROSS-REFERENCE TO RELATED APPLICATIONS

This application is a § 371 national stage entry of International Application No. PCT/DE2018/000192, filed on Jun. 18, 2018, which claims priority to German Patent Application No. 10 2017 005 809.1, filed on Jun. 20, 2017, the entire contents of which are incorporated herein by reference.

The invention relates to a device and to a method for safely and quickly transferring new glass sheets from the production line to a transport vehicle.

The production of large-area glass sheets is effected in the form of float glass by molten glass being continuously poured out along a tin bed heated in an oblong tub and the glass ribbon produced therefrom. Said glass ribbon comprises one side which was lying on the tin bath, the so-called bath side. The other side of the glass ribbon which has been cooled in the air is designated as the so-called air side. The bath side and the air side comprise different characteristics. As, for example, the air side comprises fewer irregularities, it is suited better for coatings. The subsequent fabrication of the float glass is effected by the glass ribbon, which emerges from the float glass production at a certain feed speed, being cut lengthwise and being cut transversely. The lengthwise cutting is brought about in this connection by lengthwise cutting wheels which are installed in a stationary manner in the corresponding position above the glass ribbon and the transverse cutting is effected by means of cutting bridges and transverse cutting wheels moved thereon transversely above the glass ribbon. A size of 6 meters times 3.21 meters is designated in this connection as a so-called jumbo sheet or large format. A sheet size of 3.21 meters times 2 meters (up to 2.5 meters) is designated as a so-called split size or medium format.

In order to transport glass sheets of such a size from one site to another free from breakage, holding mechanisms, mostly in the form of a sturdy frame, are moved towards the relevant glass sheet and are connected to the same via suction cups. The holding mechanism with the glass sheet sucked thereto is then conveyed further.

A device for transferring sheet material in a production plant and a relevant production plant with sheet material are disclosed in document DE 20 2010 017 750 U1 as the prior art.

In this connection, the objective of said device is the provision of a device for transferring sheet material in a production plant, which device is improved in relation to the named prior art and eliminates some of the previously named disadvantages.

According to claim 1, to this end a device for transferring sheet material in a production plant is to be protected, having a first arm (1) which is drivable about a first rotational axis (1A), at least one second arm (29) which is drivable about a second rotational axis (2A) which is mounted on the first arm, the second rotational axis (2A) being parallel to the first rotational axis (1A).

Additionally claimed is a manipulating device (3) for the sheet material to be transferred which is arranged on the at least one second arm (2) and can grip and release the sheet material in a selective manner, wherein the movement of the first arm (1) about the first rotational axis (1A) and the movement of the second arm (2) about the second rotational axis (2A) is controlled or controllable such that the manipulating device (3) is pivoted in a movement to a transfer position under a range defined by the plate material to be transferred in the transfer position and is positioned from the bottom to the plate material in the transfer position.

The object underlying the present invention is to provide a device and a method for conveying plate-shaped materials, in particular glass sheets, from the production line in a quick and damage-free manner into a transport vehicle, in particular a truck.

The solution to said object is arrived at with the features in claim 1.

A device for safely and quickly transferring new glass sheets from the production line to a transport vehicle having the following features a glass sheet roller conveyor (8) having a glass rack gripping and stacking device (7) for receiving glass sheets (9) from a production line, two parallel rails (12) running centrically at right angles to the glass sheet roller conveyor (8), wherein an underfloor energy supply rail (24) is arranged in the region between the rails (12), at least one glass rack carriage (3) which moves along the rails (12) and has at least one glass rack (4, 6) supported thereon, wherein a glass rack (4, 6) can be loaded with obliquely positioned glass sheets (9) and wherein the glass racks (4, 6) are fixed in the oblique position by means of a pivoting device (14), a rotary device (2), which is arranged within the course of the rails, for rotating a glass rack carriage (3) by 180 degrees for loading one glass rack carriage (3) in each case. And for detection of the integrity of a glass rack (4, 6), a stabilizing device (10) is provided on the upper side of the center wall (5) of the rotary device (2), wherein a 3D scanning device (17) is mounted on each arm (16) of the stabilizing device (10).

And a transfer path (29), which extends transversely to the rails (12) and has transfer slides (30, 28) for a carriage (3) with a glass rack, is provided as a reserve. And a detection device (22) for the loading operation is provided in each case at the loading position (23) in the region of the glass sheet roller conveyor (8) on both sides of the relevant glass rack carriage (3).

And the method as claimed in claim 5.

A method for safely and quickly transferring new glass sheets from the production line to a transport vehicle with the following features:

a glass sheet (9) supplied from a conveyor line is supplied by a roller conveyor (8) and is moved by means of a glass rack gripping and stacking device (7) onto a glass rack (4, 6) which is supported on a glass rack carriage (3), once the glass rack carriage (3) has been filled in a manner predetermined in numbers for the glass rack (4, 6), said glass rack carriage is moved by means of its drive (13) onto a rotary device (2), is fixed on the rotary device (2) by means of a stabilizing device (10) and is rotated quickly by 180 degrees for loading with a further glass rack carriage (3), once the rotary device (2) has been loaded with two glass rack carriages (3), said glass rack carriages are conveyed into the respective relevant glass transport vehicle (1) which is standing by. And in the case of glass breakage or possible faults, a further rail in the form of a transfer track (29) with transfer carriage (30, 28) is available. And a detection device (22) is provided at the loading position (23) in the region of the glass sheet roller conveyor (8) on both sides of a glass rack carriage (3). Also, a computer program having a program code for carrying out the method steps when the program is executed in a computer. And a machine-readable carrier having the program code of a computer program for carrying out the method when the program is executed in a computer.

The invention is described in more detail below. The figures in detail are as follows:

FIG. 1: shows an overview of the transfer operation

Figure 2:
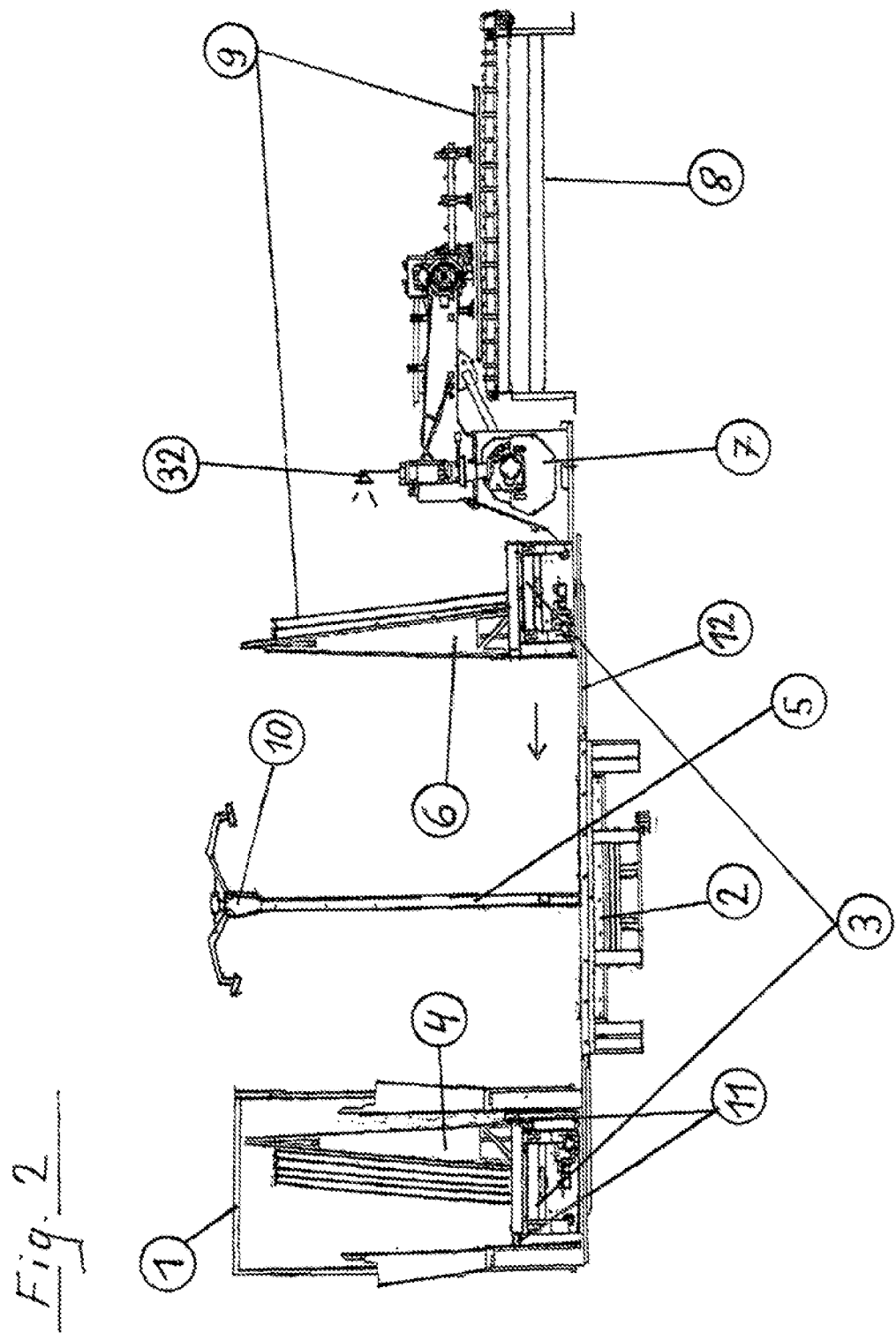

FIG. 2: shows a cross sections of the transfer operation

Figure 3:
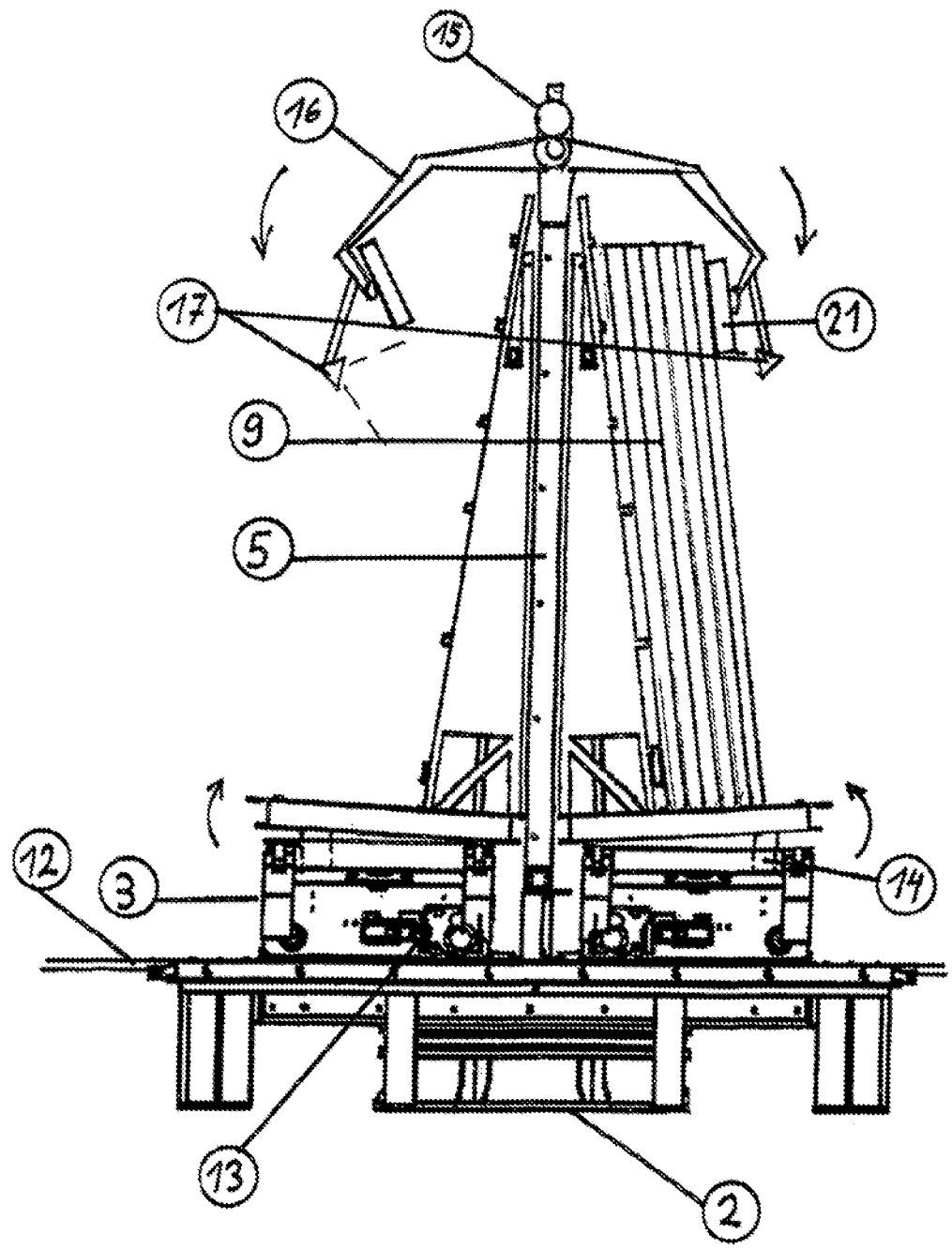

FIG. 3: shows a cross section of the stabilizing device 10

Figure 4:
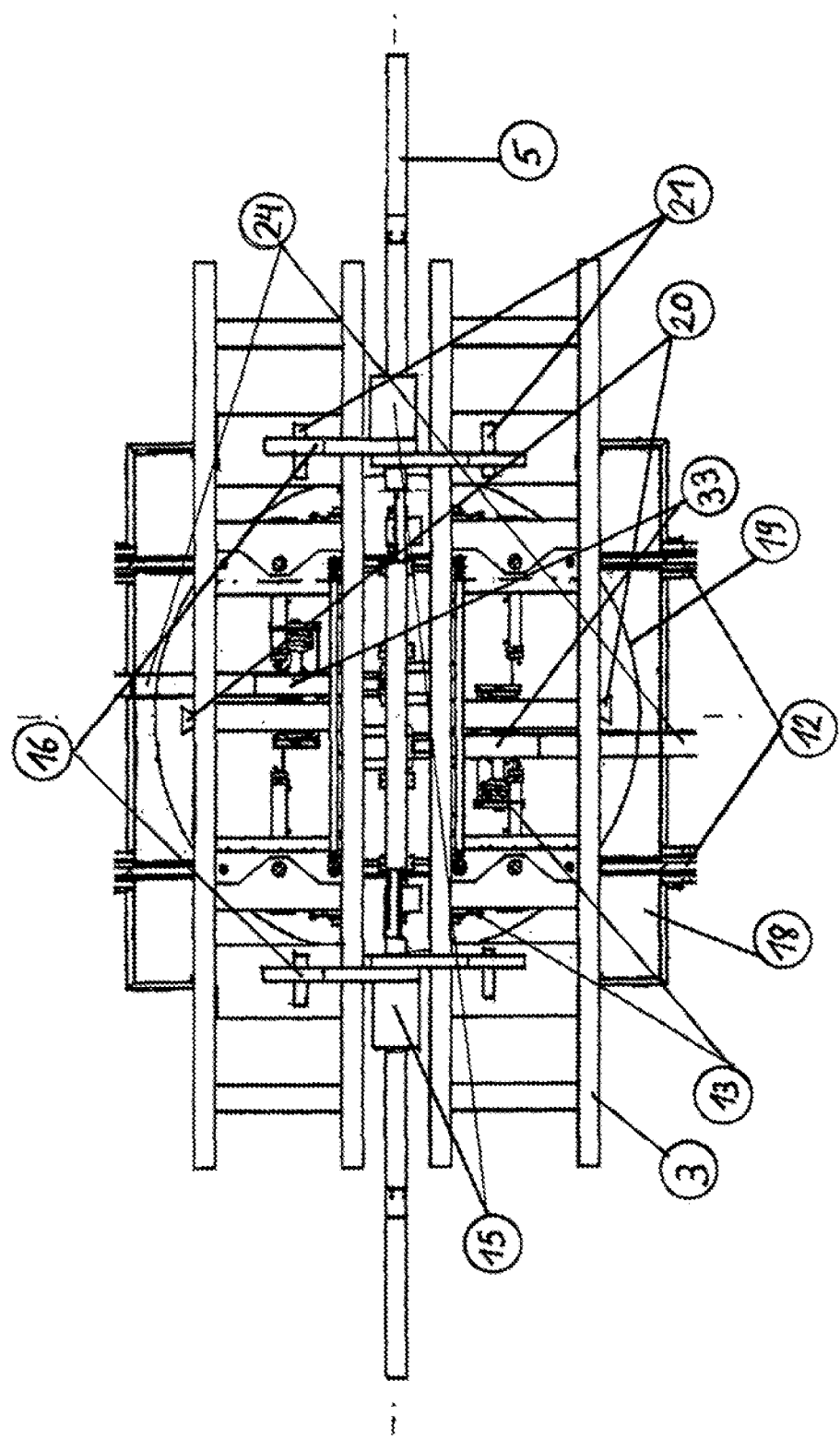

FIG. 4: shows a top view of the rotary device 2

Figure 5:
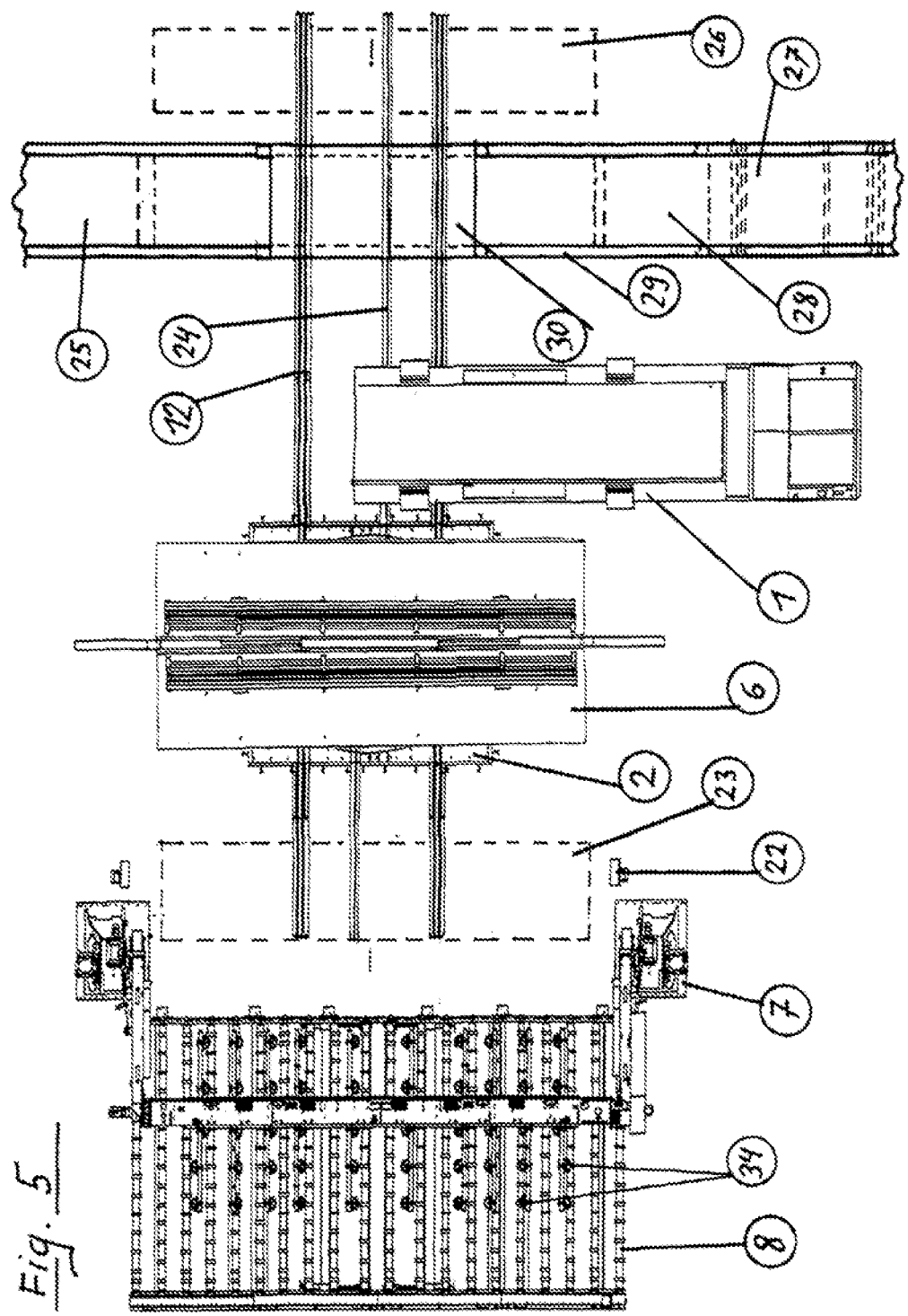

FIG. 5: shows a shunting device for eliminating faulty glass rack carriages

Figure 6A:
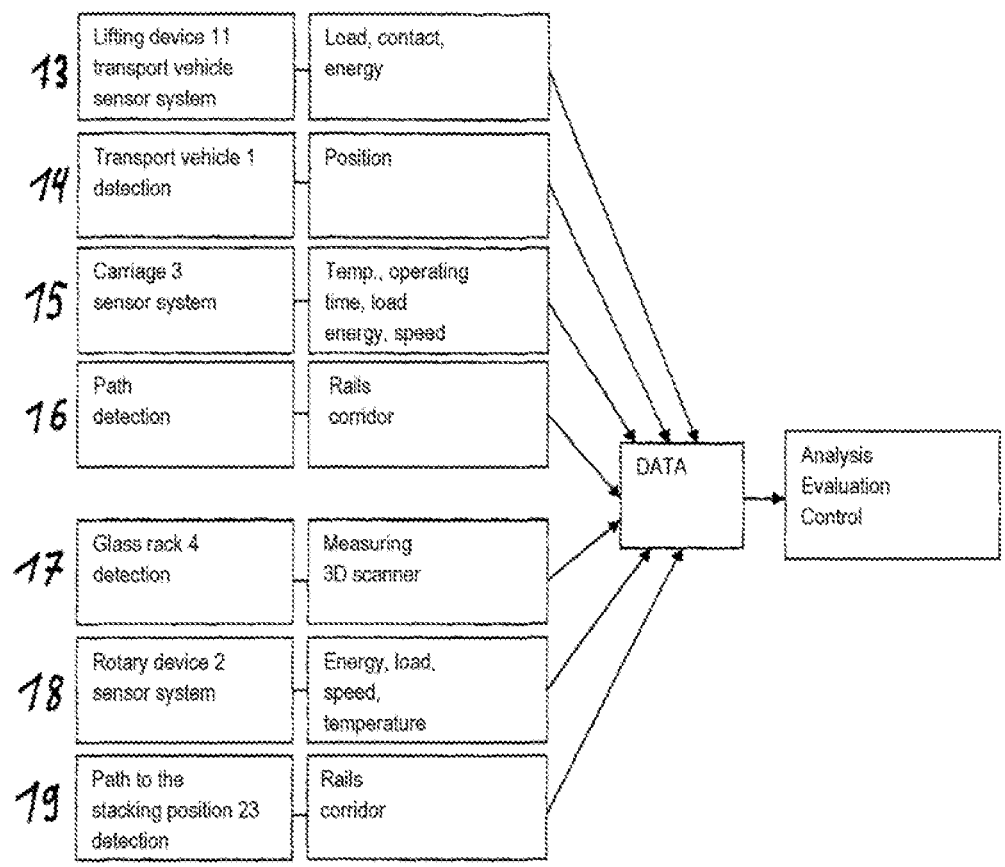

FIG. 6: shows an overview of the operating data of the entire system during the transfer processes FIG. 6*a*: shows the continuation of the overview of FIG. 6.

FIG. 1: shows an overview of the transfer operation of a stack of glass sheets 9. It can be seen on the right-hand side how a gripping and stacking device 7 sets a glass sheet 9, which has been delivered on a glass sheet roller conveyor 8, onto a glass rack carriage 3. The device 7 uses grippers 34 for this purpose, as shown in FIG. 5. The glass rack carriage 3 is connected to a rotary device 2 which makes it possible to rotate the glass rack carriage 3 into a position which is suitable for the loading of a transport vehicle 1 which is present in each case and is to be loaded. The rotary device 2 makes it possible for an empty glass rack carriage 3 to be moved closer to the glass rack gripping and stacking device 7 for filling and then to be rotated in the loaded state and the other side to be filled. The transport vehicle 1 is open on the underside in the rear part so that it can move over a loaded carriage 3. A lifting device 11, which can lift the glass rack 4 which is supported on a glass rack carriage 3, is situated in the glass transport vehicle 1 so that the glass rack 4 can remain in the transport vehicle 1 and the empty glass rack carriage 3 can move out of the glass transport vehicle 1, or the glass transport vehicle 1 can move forward by itself. Said situation can be seen in FIG. 2. The corresponding surface for loading a glass transport vehicle 1 is designated by way of the reference 31 in FIG. 1. The rotary device 5 comprises a center wall 5, on the left-hand side of which in FIG. 1 a filled glass rack is shown and the right-hand side of which shows a glass rack in the loading state. A glass rack 4 is a torsion-resistant rack produced from tubular steel.

FIG. 2: shows a cross section of the transfer operation in detailed form.

Here, on the left-hand side, it is possible to see in the glass transport vehicle 1 a glass rack carriage 3 with a filled glass rack 4 connected to a lifting device 11 for removal and on the left-hand side of the glass rack gripping and stacking device 7 a further glass rack carriage 3 with two glass sheets 9 of a glass rack 6 is shown in the loading state, a further glass sheet 9 being supported on the glass sheet roller conveyor 8. The lifting device 11 serves for the purpose of lifting a glass rack 4 up to the loading height of the glass transport vehicle 1, as described in the case of FIG. 1. The glass rack carriages 3 are conveyed to the glass transport vehicle 1 by the glass sheet roller conveyor 8 on the rails 12 shown. The rotary device 2, which is shown in cross section, with its center wall 5 comprises a stabilizing device 10 on the upper side of the center wall 5, said stabilizing device can be used on both sides of said wall and, as shown in FIG. 3, is able to support a stack of glass sheets on each side in order to prevent a stack of glass sheets tipping up and moving when the rotary device 2 rotates. In this way, the speed of the rotary device 2 can be safely increased. In this side view, one of multiple glass breakage detectors 32 can be seen in the region of the glass rack gripping and stacking device 7. Here, the glass sheet roller conveyor 8 detects whether or not the respective glass sheet is perfect immediately after reloading.

FIG. 3: shows a cross section of the stabilizing device 10. The drive 13 of a glass rack carriage 3, which is moved along the rails 12, is shown above the rotary device 2. A pivoting device 14 can be seen on the right-hand side for the inclination of a loaded stack of glass sheets 9 and for the fixing and the tilting of the position of a glass sheet in the direction of the center wall 5 of the rotary device 2. This also makes it possible, as does the stabilizing device 10, to rotate the rotary device 2 in a risk-free and quick manner. The stabilizing device 10 comprises a drive 15 which can move the arms 16 on both sides of the center wall 5 downward. A 3D stabilizing device 17 serves for detecting a glass rack. Said device 17 detects whether the respectively present glass rack is damaged or its structure is warped by means of a comparison with a perfect glass rack using a pattern recognition algorithm. One of two stabilizer pressure plates which also serve for stabilizing glass sheets 9, is designated by way of the reference 21 on the right-hand side.

FIG. 4: shows a top view of the rotary device 2 with two carriages without a glass rack and without glass sheets. The circle shown in the center characterizes the rotary plate 19 of the rotary device 2. The longest extent in the diameter of the rotary device 2 shown comprises the center wall 5 of the rotary device 2 shown from above, a drive 15 for the stabilizing device being designated here on the left-hand side of the center wall 5 and the corresponding drive on the right-hand side not being shown. An arm 16 of the stabilizing device can be seen from above on the two sides of the respective stabilizing device on both drives of the respective stabilizing device on the upper side of the center wall 5, a pressure plate 21 being designated in each case on the right-hand side.

It is possible to see the side walls of a glass rack carriage 3 on both sides of the center wall 5 in each case from above, parts of the drive 13 of the relevant glass rack carriage being designated on the left- and side of FIG. 4.

The square outline of the basic body 18 of the rotary device 2 can be seen, having the same center point as the rotary plate 19.

The rails 12, along which the respective glass rack carriage is moved, extend transversely to the center wall 5.

Parts of the underfloor energy supply rail 24, which is also described in FIG. 5, can be seen in the region of the rotary device 2 in the top and bottom part of the image. The current consumers 33 shown in said region also serve for supplying energy.

For detecting the location of a glass rack carriage, the two path detection sensors 20, which are directed in the direction of the rails 12 on both sides, serve for detecting the path of a carriage.

FIG. 5 shows a shunting device for eliminating faulty glass rack carriages.

From the left-hand side of the overview in FIG. 5, rails 12 run from the glass sheet roller conveyor 8 with its glass rack gripping and stacking device 7 and its grippers 34 via a loading position 23 under a glass rack 6 in the loading state on the rotary device 2 through into the region of a glass transport vehicle 1 up to a reserve position 26 for a possible transfer.

Detection devices 22 are mounted at the loading position 23 and an energy supply rail 24 runs between the rails 12.

A transfer position 25 with the No. 1 and a transfer position 28 with the No. 2 with transfer slides 30 and 27 on a transfer path 29 are shown on the right-hand side in FIG. 5. A reserve position 26 for a further transfer is available as an alternative.

Glass rack carriages 3 possibly required additionally can be moved to any point of the transfer system by means of a crane or a stacking device which is not shown.

FIG. 6 shows an overview of the operating data of the entire system during the transfer processes.

Twelve of a total of 19 steps are shown here, from each of which data is determined which leads to characteristic data which serves for analysis and evaluation of said data and for controlling the system.

The $1^{st}$ step relates to the glass sheet roller conveyor 8 and its sensor system. The data determined here relates to the temperature of the glass sheets, the speed of the incoming glass sheets, the operating time and the energy consumption during the operation of the roller conveyor 8.

The $2^{nd}$ step relates to the grippers 34 with which a glass sheet is gripped and their sensor system. The respective data relates to the available vacuum of the relevant gripper 34 and the energy expenditure thereof when generating the vacuum. In addition, the respectively prevailing temperature is measured. Furthermore, the distance between the gripper 34 and the glass sheet is determined along with the force that acts on the glass sheet.

The sensor system of the glass rack gripping and stacking device 7 is measured in the $3^{rd}$ step. Here too, the operating temperature is important along with the clock time obtained during operation. Furthermore, the energy consumption is measured.

The $4^{th}$ step relates to the detection of the respectively conveyed glass sheet 9. Primarily, the operating data of the 3D scanning device 17 is looked at here relating to a glass breakage and/or fault in the structure of a glass sheet.

Said 4 operating steps relate to the operation of receiving a glass sheet and the determined data is obtained with each glass sheet received.

The sensor system of a carriage 3 is examined in the $5^{th}$ step. The data determined relates, in this connection, to the determining of the supported load, along with the operating time and the operating temperature. In addition, the speed of a carriage 3 is measured along with the energy consumption required in operation.

The $6^{th}$ step relates to the detection and the measuring of the distance covered respectively by each glass sheet carriage 3. The occupancy of the rails 12 and the free corridor for a planned drive path are measured in this connection.

The sensor system of the pivoting device 14 during the operation of a glass sheet carriage 3 is measured in the $7^{th}$ step. The pressure of the supported glass rack and its load are determined along with the energy consumption of the pivoting device 14 when a glass rack is pivoted to the center wall 5 of the rotary device 2.

In addition, the operating temperature and the clock rate of the pivoting operation is determined.

The $8^{th}$ step relates to the stabilizer 10.

Here, the force with which each arm 16 fixes a stack of glass sheets is determined. In addition, the clock rate obtained in operation and the energy consumption are important as characteristic values.

The $9^{th}$ step relates to the sensor system of the rotary device 2. The supported load and the energy consumption during the rotating operation are measured. In addition, the speed obtained in each case and the operating temperature are measured.

The $10^{th}$ step relates to the detection and the measuring of the distance covered in each case by a glass sheet carriage 3. The occupancy of the rails 12 and the free corridor for a planned drive path are measured in this connection.

The $11^{th}$ step relates to the detection of the loading region 31 for the transport vehicle 1. Whether the position 31 is free or occupied is determined here.

The transport vehicle 1 is detected in the $12^{th}$ step. The position of the respective vehicle 1 is determined.

FIG. 6a shows the continuation of the overview from FIG. 6.

The sensor system of the lifting device 11 in the glass transport vehicle 1 is treated in the $13^{th}$ step. The load which the respective glass rack constitutes is determined and the energy consumption which the lifting device 11 uses for lifting the glass rack is measured. In addition, the contact between the glass rack and the respective vehicle 1 is recorded.

The transport vehicle 1 is detected in the $14^{th}$ step. The position of the respective vehicle 1 is determined.

The sensor system of a carriage 3 is examined in the $15^{th}$ step. The data determined relates, in this connection, to the determining of the supported load along with the operating time and the operating temperature. In addition, the speed of a carriage 3 is measured along with the energy consumption required in operation.

The $16^{th}$ step relates to the detection and the measuring of the distance covered in each case by a glass rack carriage 3. The occupancy of the rails 12 and the free corridor for a planned drive path are measured in this connection.

The $17^{th}$ step relates to the detection of the glass sheet 9 conveyed in each case.

The operating data of the 3D scanning device 17 which relates to a glass breakage and/or faults in the structure of a glass sheet is looked at predominantly here.

The $18^{th}$ step relates to the sensor system of the rotary device 2. The supported load and the energy consumption during the rotating operation are determined. In addition, the speed obtained in each case and the operating temperature are measured.

The $19^{th}$ step relates to the path to the loading position 23.

The occupancy of the rails 12 and the free corridor for a planned drive path are measured in this connection.

LIST OF REFERENCES

1 Glass transport vehicle
2 Rotary device
3 Glass rack carriage
4 Glass rack (filled)
5 Center wall of the rotary device
6 Glass rack (ready for loading)
7 Glass rack gripping and stacking device
8 Glass sheet roller conveyor
9 Glass sheets
10 Stabilizing device
11 Lifting device for a glass rack
12 Rails
13 Drive for a glass carriage
14 Pivoting device
15 Drive for the stabilizing device
16 Arm of the stabilizing device
17 3D scanning device for detecting a glass rack
18 Basic body of the rotary device 2

19 Rotary plate of the rotary device 2
20 Path detection sensor for the carriage track
21 Stabilizer pressure plate
22 Detection device for the loading operation
23 Loading position
24 Underfloor energy supply rail
25 Transfer position No. 1
26 Reserve position for a transfer
27 Transfer slide No. 2 for a carriage with a glass rack
28 Transfer position No. 2
29 Transfer track
30 Transfer slide No. 1
31 Loading area of the transport vehicle
32 Glass breakage detectors
33 Current collector
34 Gripper

The invention claimed is:

1. A device for safely and quickly transferring a glass sheet from a production line to a transport vehicle, comprising:
a glass sheet roller conveyor (8) having a glass rack gripping and stacking device (7) for receiving a glass sheet (9) from the production line,
two parallel rails (12) running at right angles to a longitudinal direction of the glass sheet roller conveyor (8), wherein an underfloor energy supply rail (24) is arranged in a region between the rails (12),
at least one glass rack carriage (3) moving along the two parallel rails (12) having at least one glass rack (4, 6) supported thereon, wherein a glass rack of the at least one glass rack (4, 6) can be loaded with obliquely positioned glass sheets (9) and wherein the glass rack of the at least one glass rack (4, 6) is fixed in an oblique position by a pivoting device (14), and
a rotary device (2), arranged within a course of the parallel rails, for rotating a glass rack carriage (3) of the at least one glass rack carriage by 180 degrees for loading the glass rack carriage (3) of the at least one glass rack carriage on the transport vehicle, wherein said rotary device rotates about a vertical axis.

2. The device as claimed in claim 1, further comprising a stabilizing device (10) provided on an upper side of a center wall (5) of the rotary device (2) for detection of the integrity of a glass rack (4, 6), wherein a 3D scanning device (17) is mounted on each arm (16) of the stabilization device (10).

3. The device as claimed in claim 1, further comprising a transfer track (29), which extends transversely to the two parallel rails (12) and has transfer slides (30, 28) for receiving the glass rack carriage (3) of the at least one glass rack carriage with the glass rack of the at least one glass rack.

4. The device as claimed in claim 1, further comprising a detection device (22) for the loading a glass rack of the at least one glass rack carriage at a loading position (23) in a region of the glass sheet roller conveyor (8) on both sides of the respective glass rack carriage (3).

5. A method for safely and quickly transferring a glass sheets from a production line to a transport vehicle, comprising:
supplying a glass sheet (9) from a conveyor line by a roller conveyor (8) to a glass rack (4, 6) which is supported on a glass rack carriage (3),
moving, once the glass rack carriage (3) has been filled in a manner predetermined in numbers for the glass rack (4, 6), said glass rack carriage along the two parallel rails (12) running at right angles to a longitudinal direction of the glass sheet roller conveyor (8) toward and onto a rotary device (2), fixing the glass rack carriage on the rotary device (2) with a stabilizing device (10), and rotating the glass rack carriage by 180 degrees about a vertical axis for loading with a further glass rack carriage (3), and
conveying, once the rotary device (2) has been loaded with two glass rack carriages (3), said glass rack carriages into the respective glass transport vehicle (1).

6. The method as claimed in claim 5, further comprising providing a further rail in a form of a transfer track (29) with a transfer carriage (30, 28) in case of glass breakage or possible faults.

7. The method as claimed in claim 5, a further comprising providing a detection device (22) at the loading position (23) in a region of the glass sheet roller conveyor (8) on both sides of a glass rack carriage (3).

8. A computer program having a program code for carrying out the method steps as claimed in claim 5 when the program is executed in a computer.

9. A machine-readable carrier having a program code of a computer program for carrying out the method as claimed in claim 5 when the program is executed in a computer.

10. A device for safely and quickly transferring new glass sheets from a production line to a transport vehicle, comprising:
a glass sheet roller conveyor (8) having a glass rack gripping and stacking device (7) for receiving glass sheets (9) from the production line,
two parallel rails (12) running at right angles to a longitudinal direction of the glass sheet roller conveyor (8), wherein an underfloor energy supply rail (24) is arranged in a region between the two parallel rails (12),
at least one glass rack carriage (3) moving along the two parallel rails (12) having at least one glass rack (4, 6) supported thereon, wherein a glass rack of the at least one glass rack (4, 6) can be loaded with obliquely positioned glass sheets (9) and wherein the glass rack of the at least one glass rack (4, 6) is fixed in the oblique position by a pivoting device (14),
a rotary device (2), arranged within the course of the two parallel rails, for rotating a glass rack carriage (3) by 180 degrees for loading a glass rack carriage of the at least one glass rack carriage (3),
wherein said rotary device is adapted so that said obliquely positioned glass sheets (9) maintain an oblique position during the 180 degree rotating.

11. The device as claimed in claim 10, further comprising a stabilizing device (10) having at least two arms provided on an upper side of a center wall (5) of the rotary device (2) for detecting the integrity of a glass rack (4, 6), wherein a 3D scanning device (17) is mounted on each arm (16) of the stabilization device (10).

12. The device as claimed in claim 10, further comprising a transfer track (29), which extends transversely to the two parallel rails (12) and has transfer slides (30, 28) for a carriage (3) with a glass rack.

13. The device as claimed in claim 10, further comprising a detection device (22) for the loading the glass rack carriage of the at least one glass rack carriage at a loading position (23) in a region of the glass sheet roller conveyor (8) on both sides of the respective glass rack carriage (3).

* * * * *